United States Patent [19]
Giacomelli et al.

[11] Patent Number: 5,775,055
[45] Date of Patent: *Jul. 7, 1998

[54] ULTRASONIC SEALING ANVIL

[75] Inventors: Peter Giacomelli, Lund; Erik Schott, Bjarred, both of Sweden; Ikuro Yokoyama, Arlington Heights; Takashi Omiya, Buffalo Grove, both of Ill.; Michio Sugata, Yokohama, Japan

[73] Assignee: Tetra Laval Holdings & Finance, S. A., Pully, Switzerland

[*] Notice: The term of this patent shall not extend beyond the expiration date of Pat. No. 5,605,026.

[21] Appl. No.: 803,836

[22] Filed: Feb. 21, 1997

[51] Int. Cl.⁶ ................................................. B65B 51/10
[52] U.S. Cl. .................. 53/371.2; 53/DIG. 2; 53/374.2; 53/565; 156/580.1; 156/580.2
[58] Field of Search ........................ 53/371.2, 565, 53/374.2, DIG. 2; 156/580.1, 580.2, 73.1

[56] References Cited

U.S. PATENT DOCUMENTS

| | | |
|---|---|---|
| 2,633,894 | 4/1953 | Carwile . |
| 3,436,006 | 4/1969 | Cole . |
| 3,556,912 | 1/1971 | Burgo et al. . |
| 3,586,589 | 6/1971 | Jugler . |
| 3,612,385 | 10/1971 | Humpage . |
| 3,649,421 | 3/1972 | Berleyoung . |
| 3,661,661 | 5/1972 | Berleyoung . |
| 3,679,526 | 7/1972 | Horton . |
| 3,867,232 | 2/1975 | Thompson et al. . |
| 3,905,280 | 9/1975 | Egleston et al. . |
| 3,947,307 | 3/1976 | Buchscheidt . |
| 4,037,772 | 7/1977 | Dupuis . |
| 4,040,886 | 8/1977 | Yen et al. . |
| 4,158,584 | 6/1979 | Clarke et al. ................ 156/73.1 |
| 4,193,833 | 3/1980 | Young . |
| 4,227,959 | 10/1980 | Brown ........................ 156/73.1 |
| 4,251,303 | 2/1981 | Deimel et al. . |
| 4,279,675 | 7/1981 | Braun . |
| 4,374,697 | 2/1983 | Tsuzuki et al. . |
| 4,401,501 | 8/1983 | Stumpf . |
| 4,403,465 | 9/1983 | Bachner . |
| 4,426,244 | 1/1984 | Wang . |
| 4,444,614 | 4/1984 | Krayer . |
| 4,461,662 | 7/1984 | Onishi . |
| 4,542,771 | 9/1985 | Payet et al. . |
| 4,575,372 | 3/1986 | Gundersen . |
| 4,581,873 | 4/1986 | Knuppertz et al. . |
| 4,588,390 | 5/1986 | Heitele et al. . |
| 4,606,786 | 8/1986 | Andersson . |
| 4,640,733 | 2/1987 | Bogren . |
| 4,647,325 | 3/1987 | Bach . |
| 4,711,693 | 12/1987 | Holze, Jr. . |
| 4,767,492 | 8/1988 | Fukusima et al. . |
| 4,789,095 | 12/1988 | Kobayashi . |
| 4,803,827 | 2/1989 | Posey et al. . |
| 5,057,182 | 10/1991 | Wuchinich ................ 156/580.1 |
| 5,085,029 | 2/1992 | Esper . |
| 5,183,523 | 2/1993 | Rinehart et al. ............ 53/374.4 |
| 5,488,812 | 2/1996 | Stark et al. . |
| 5,571,370 | 11/1996 | Selberg et al. ............. 53/374.2 |
| 5,605,026 | 2/1997 | Schott ........................ 53/373.7 |

*Primary Examiner*—James F. Coan
*Assistant Examiner*—Gene L. Kim
*Attorney, Agent, or Firm*—Michael A. Catania

[57] ABSTRACT

An anvil system including a plurality of anvils having an interconnected cooling system. Each of the anvils has a means for acoustically insulating the anvil body from ultrasonic energy which originates from a ultrasonic horn. The insulation means may be a airspace slot essentially separating the vibrating portion of the anvil from the anvil body. The anvil may also have an adjustable sealing pattern which allows for facilitated exchange of sealing patterns. The anvil may also have a plurality of projecting pads which reduces damage to the ultrasonic sealing equipment and to the object to be sealed.

19 Claims, 8 Drawing Sheets

ULTRASONIC SEALING ANVIL

BACKGROUND OF THE PRESENT INVENTION

1. Field of the Invention

The present invention relates to ultrasonic sealing anvil. Specifically, the present invention relates to an ultrasonic sealing anvil with acoustical insulation.

2. Description of the Related Art

Gable-top cartons or containers are used widely for packaging milk, juices, and other foods, as well as a variety of other products. Such cartons are fabricated from a sheet material which is heat-sealable to itself. The typical material is paper board on both sides coated with polyethylene or another heat-sealable material. The construction and parts of such containers and the blanks from which they are formed are described and illustrated, for example, in U.S. Pat. No. 4,744,467, issued to Tetra Pak International AB, and U.S. Pat. No. 4,775,096, issued to AB Tetra Pak. Those entire patents are hereby incorporated by reference.

Gable closures are conventionally sealed by folding the carton along preformed score lines to form an upstanding fin (or, for a bottom closure, a depending fin) having several thickness of heat sealable material. The fin is captured between an ultrasonic sealing horn and an anvil, and an ultrasonic energy transduced to the joint through the horn causes the heat-sealable material in the fin to fuse, forming a seal.

One problem which must commonly be addressed when ultrasonic sealing equipment is designed is how to prevent the intentionally separate moving parts of the equipment from being welded together, should they come into contact accidentally or intentionally during a sealing operation. Another problem is how to prevent ultrasonic vibrations from straying from the sealing site to other parts of the anvil or machinery. Yet another problem is cooling the anvil, or anvils, during the sealing operation without deterring from the sealing operation.

BRIEF SUMMARY OF THE INVENTION

The present invention is an anvil for utilization with an ultrasonic horn for sealing the closure of a carton having first and second sides and disposed at a closure sealing position. A typical closure which may be sealed by the anvil of the present invention is a gable-top or bottom closure for a liquid food carton. The present invention is a component of a carton sealer which may be a station on gable-top carton packaging machine.

One aspect of the present invention is an anvil for utilization in conjunction with an ultrasonic horn. The anvil includes an anvil body, a vibrating portion, a sealing portion having a predetermined sealing pattern, means for acoustically insulating the anvil body, and a cooling system. The vibrating portion is located forward from the anvil body. The sealing portion is disposed above the vibrating portion. The means for acoustically insulating the anvil body is disposed between the anvil body and the vibrating portion.

The means for acoustically insulating the anvil body may include the anvil body connected to the vibrating portion by a pair of parallel bridges thereby forming an airspace slot separating the anvil body from the vibrating portion. The pair of parallel bridges forming a boundary around the airspace slot along with the anvil body and the vibrating portion. Alternatively, the means for acoustically insulating the anvil may include a membrane composed of a rubber configured to increase the bond stress relative to the repetitive stress.

The sealing portion may be comprised of a bar having a upper surface and a lower surface. The upper surface may have the predetermined sealing pattern thereon and the lower surface disposed to the vibrating portion. The sealing portion may be connected to the vibrating portion without contact with the means for acoustically insulating the anvil. The cooling system may include the vibrating portion having a passageway for the flow of a heat sink fluid therethrough. The heat sink fluid may be water. The configuration of the membrane may consists of a first straight portion parallel with the sealing portion, a first diagonal portion connected to the first straight portion on one end, a second straight portion parallel to the first straight portion and displaced rearward from the first portion, the second straight portion connected to the first diagonal portion at an opposite end to the first diagonal portion connection to the first straight portion, a second diagonal portion connected to the second straight portion at an end opposite to the first diagonal connection to the second straight portion, a third straight portion connected to the second diagonal portion, the third straight portion parallel to the sealing portion and in the same plane as the first straight portion. The sealing portion may be interchanged with other sealing portions.

The airspace slot substantially reduces the transfer of energy from the vibrating body to the anvil body. The anvil may further include a plurality of pads projecting from the sealing portion and disposed on the sealing portion to avoid interference with the ultrasonic sealing. Each of the plurality of pads have a predetermined length substantially corresponding to the minimal thickness of an object undergoing ultrasonic sealing. The ultrasonic horn may include a convertor and sonotrode having a plurality of pads projecting therefrom and disposed on the sonotrode to avoid interference with the ultrasonic sealing. Each of the plurality of pads have a predetermined length substantially corresponding to the minimal thickness of an object undergoing ultrasonic sealing.

Another aspect of the present invention is an anvil system for utilization in conjunction with a multitude of ultrasonic horns. The anvil system includes an anvil bar, a plurality of anvils, a plurality of interconnecting tubes, a heat sink fluid source and a discharge receptacle. The anvil bar connected to an anvil drive which provides movement to the anvil bar. The plurality of anvils are mounted to the anvil bar. Each of the plurality of anvils having a passageway for cooling of the anvil through the transference of heat from the anvil to a heat sink fluid flowing through the passageway. Each of the plurality of anvils capable of performing individual sealing operations in conjunction with an ultrasonic horn. The plurality of interanvil connecting tubes transfer the heat sink fluid between each of the plurality of anvils. Each of the plurality of interanvil connecting tubes are sealed to each corresponding anvil of the plurality of anvils by at least one O-ring. The heat sink fluid source in flow communication with the plurality of interanvil connecting tubes through an inlet tube. The discharge receptacle in flow communication with the plurality of connecting tubes through an outlet tube.

Each of the plurality of anvils further includes an anvil body, a vibrating portion, a sealing portion and means for acoustically insulating the anvil body. The vibrating portion is located forward from the anvil body. The sealing portion is disposed above the vibrating portion and has a predetermined sealing pattern thereon. The means for acoustically insulating the anvil body is disposed between the anvil body and the vibrating portion. Each of the plurality of interanvil connecting tubes may be composed of a substantially stainless steel material. The plurality of interanvil connecting tubes permits each individual anvil to move independently of one another. The means for acoustically insulating the anvil includes the anvil body connected to the vibrating portion by a pair of parallel bridges thereby forming an airspace slot separating the anvil body from the vibrating portion with the pair of parallel bridges forming a boundary around the airspace slot along with the anvil body and the vibrating portion. Alternatively, the means for acoustically insulating the anvil may include a membrane composed of rubber configured to increase the bond stress relative to the repetitive stress.

Each of the multitude of ultrasonic horns may include a convertor and sonotrode. The sonotrode may have a plurality of pads projecting therefrom and disposed on the sonotrode to avoid interference with the ultrasonic sealing. Each of the plurality of pads have a predetermined length substantially corresponding to the minimal thickness of an object undergoing ultrasonic sealing.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWING

Several features of the present invention are further described in connection with the accompanying drawings in which:

There is illustrated in FIG. 1 a perspective view of one embodiment of the ultrasonic anvil of the present invention.

There is illustrated in FIG. 2 an anvil system of the present invention.

There is illustrated in FIG. 3 a partial cut-away view of an anvil of the anvil system of FIG. 2.

There is illustrated in FIG. 4 a side perspective of an anvil of the present invention having a specially configured rubber membrane as an insulation means.

There is illustrated in FIG. 5A a top perspective of an anvil of the prior art.

There is illustrated in FIG. 5B a side perspective of an anvil of the prior art.

There is illustrated in FIG. 6A a top perspective of the anvil with the rubber membrane of FIG. 4.

There is illustrated in FIG. 6B a side perspective of the anvil with the rubber membrane of FIG. 4.

There is illustrated in FIG. 7A a top perspective of an anvil with an alternative rubber membrane.

There is illustrated in FIG. 7B a side perspective of an anvil with an alternative rubber membrane.

There is illustrated in FIG. 8 a perspective view of alternative embodiment of the anvil of the present invention.

There is illustrated in FIG. 9 a side perspective view of an anvil of the present invention engaged with a sonotrode of an ultrasonic horn.

There is illustrated in FIG. 10 a top perspective view of an anvil of the present invention engaging a carton.

There is illustrated in FIG. 11 a top perspective view of an anvil of the present invention engaging a sealed carton There is illustrated in FIG. 12 a top perspective view of an ultrasonic carton sealer of the Schott el al patent application.

There is illustrated in FIGS. 13–15 a sealing operation performed on a gable-top closure.

DETAILED DESCRIPTION OF THE INVENTION

The ultrasonic anvil of the present invention may be used on a carton forming, filling and sealing machine such as the one described in Stark et al, U.S. Pat. No. 5,488,812, issued on Feb. 6, 1996 for a Packaging Machine, which is hereby incorporated by reference (the other parts not shown). The Stark et al packaging machine is only one example of the possible applications of the ultrasonic anvil of the present invention. Those skilled in the art are aware of many possible applications of the ultrasonic anvil which do not depart from the spirit and scope of the present invention.

Figure 1:
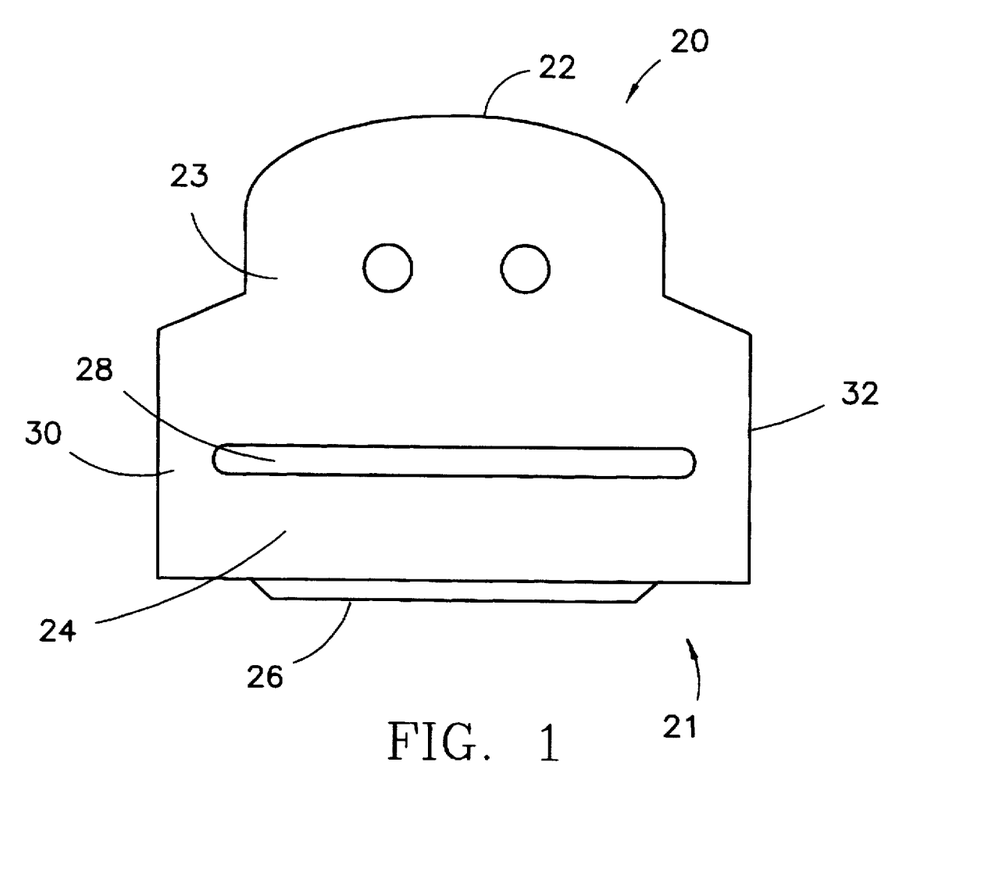

There is illustrated in FIG. 1 a perspective view of one embodiment of the ultrasonic anvil of the present invention. As shown in FIG. 1, the anvil 20 has a forward end 21 and a rearward end 22. The anvil 20 includes an anvil body 23, a vibrating portion 24, a sealing portion 26 and means for acoustically insulating the anvil body which is an airspace 28 for this embodiment of the anvil 20. The airspace 20 is bordered by the vibrating portion 24 on the forward end, the anvil body 23 on the rearward end and by a pair of parallel bridges 30 and 32 on the sides. The parallel bridges 30 and 32 also connect the vibrating portion 24 to the anvil body 23. As is apparent from FIG. 1, the parallel bridges are outside of the predetermined length of the sealing portion 26. This design allows for the stability needed by the anvil 20 for an effective sealing of a carton, not shown. The airspace 28 provides for the insulation of the anvil body 23 from the vibrating portion 24 during the activation of the ultrasonic horn which transfers energy to the anvil during the sealing process. The airspace 28 allows for the energy to be kept in the vibrating portion 24 instead of being transferred to the frame, not shown, via the anvil body 23. The acoustical insulation means is further described below.

Figure 2:
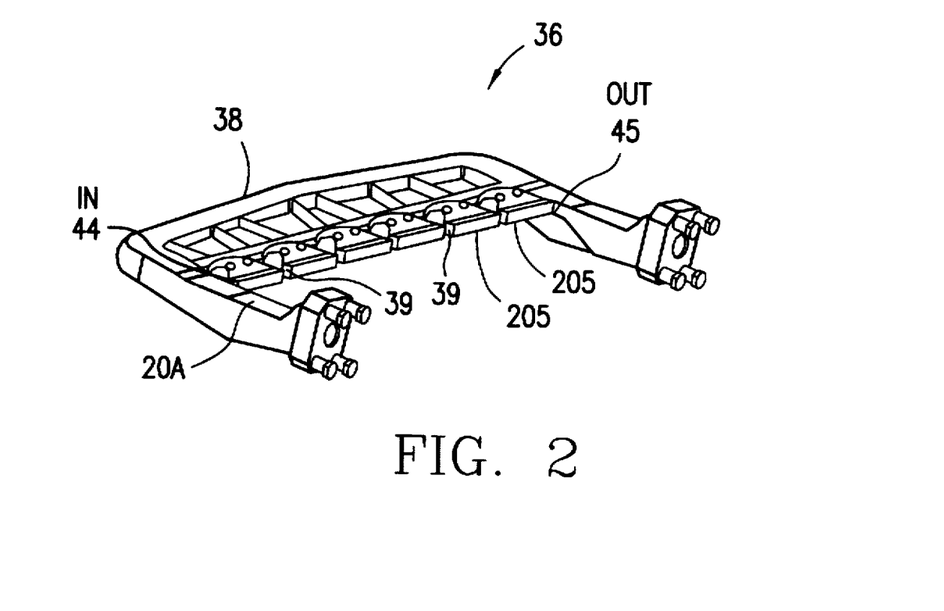

There is illustrated in FIG. 2 an anvil system of the present invention. As shown in FIG. 2, the anvil system 36 includes an anvil bar 38, a series of anvils 20A–F and a plurality of interanvil connecting tubes 39. The six anvils 20A–F allow for the sealing of six cartons simultaneously with a single reciprocal stroke of the grouped anvils 20A–F.

Although the present embodiment illustrates an anvil system with anvil bars, those skilled in the pertinent art will recognize that greater or lessor amounts of anvils may be used in practicing the present invention. The anvils 20A–F are removably mounted on the anvil bar 38 in order to facilitate replacement of the anvils 20A–F periodically.

The anvil bar 38 is arranged for traveling back and forth between an open position allowing a carton to pass, and a closed position for bearing against the one side of a closure located at the closure sealing position. In this manner, a multitude of cartons are sealed at once.

Cooling System

Figure 3:
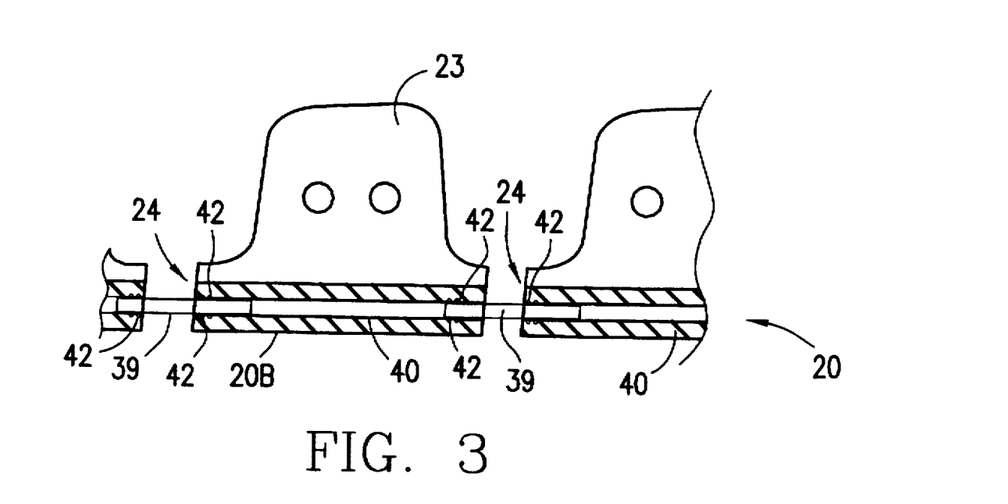

Some of the ultrasonic energy is transferred to the anvils 20A–F from the transducers or sealing horns during operation of the ultrasonic sealing device. This ultrasonic energy is dissipated from the anvils 20A–F in the form of heat. A cooling system may be utilized to prevent overheating of the anvils 20A–F during operation of the ultrasonic sealing device. The cooling system of the present invention is best illustrated in FIG. 3. As shown in FIG. 3, the cooling system consists of an internal passageway 40 through each of the anvils 20A–F, and more particularly an internal passageway 40 through the vibrating portion 24 of the anvils 20A–F. Each of the internal passageways 40 are of a predetermined diameter and extend from one side of the anvil 20 to an opposite side. The internal passageway 40 is located in a position which would have a minimal adverse effect on the operation of the anvil 20 while maximizing its cooling capabilities. The flow of the heat sink fluid through the internal passageway 40 is also a factor in the cooling capability of the internal passageway 40 since the flow rate will determine how quickly the absorbed heat is removed from the anvils 20A–F. A lower flow rate necessitates a greater surface area and viz. versa. Thus, the internal passageway 40 should have a sufficient surface area to absorb heat from the anvil 20 in a predetermined time period based on a fixed flow rate of the heat sink fluid.

Figure 4:
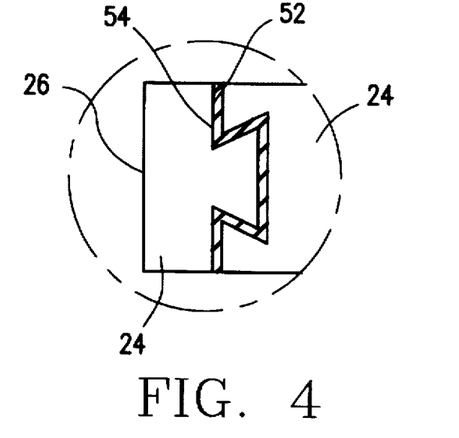

The internal passageway 40 is also removed from any contact with the means for acoustically insulating the anvil whether the acoustically insulating means is an airspace gap 28 as shown in FIG. 1, a rubber membrane as shown in FIGS. 4 and 5, or the like. The need to avoid the acoustically insulating means is a factor in the size and placement of the internal passageways 40 in each of the anvils 20A–F. In order to optimize its cooling capabilities, the internal passageways 40 must have a sufficient surface area, however the size cannot interfere with the insulating means. Also, the placement of the internal passageways 40 must not interfere with the insulating means, however, this factor must be balanced with the ability to effectively remove heat from the anvil 20.

Each of the internal passageways 40 of each of the anvils 20A–F is connected to one another through an interanvil connecting tube 39. Each of the interanvil connecting tubes 39 has a diameter which enables the tube 39 to be inserted into each of the internal passageways 40 and still allow for the effective flow of a fluid through the tube 39. Once inserted into the internal passageway 40, the interanvil connecting tube 39 is sealed to each of the anvils 20A–F through at least one, and preferably two, O-rings 42. The O-rings 42 enable each individual anvil 20 to move in relation to each other anvil 20 without disconnection of the interanvil connecting tube 39 disposed between neighboring anvils 20A–F. The interanvil connecting tubes 39 are of a predetermined length which provides them with a sufficient length to maintain their connection between neighboring anvils 20A–F when an anvil 20 is moved out of alignment with its neighboring anvil 20. In a preferred embodiment, the interanvil connecting tubes 39 are composed of a plastic material. However, other materials such as stainless steel may be employed in practicing the invention. However, those skilled in the pertinent art will recognize that a multitude of other materials may be substituted for stainless steel without departing from the scope of the present invention. The interanvil connecting tubes 39 which are connected to the each of the two end anvils 20A and F on one end of each of the tubes 39 are connected on the opposite end to an inlet tube 44 and an outlet tube 46 as shown in FIG. 2. In this manner, all of the internal passageways 40, all of the interanvil connecting tubes 39, the inlet tube 44 and the outlet tube 46 are all in flow communication with each other.

The inlet tube 44 is in flow communication with a heat sink fluid source 48, not shown, and the outlet tube 46 is in flow communication with a waste fluid depository 50, not shown. A heat sink fluid is defined as a fluid which substantially maintains the temperature through the transfer of heat between an object and the heat sink fluid. In the present invention, the heat sink fluid will probably only be utilized to transfer heat from the object, an anvil 20, to the heat sink fluid. However, the possibility, as remote as it might be, of utilizing the heat sink fluid to transfer heat to the anvil 20 is within the scope of the present invention. A preferred heat sink fluid is water, however other fluids may be employed in practicing the present invention. The inlet tube 44 may be connected directly to the common source for water or connected to a device which might first chill the water. The water will flow through inlet tube 44 to the first interanvil connecting tube 39, into the internal passageway 40 of the first anvil 20A and then through the rest of the anvils 20B–F in a similar fashion. Once the water has flowed through the last anvil 20F, it will flow through the outlet tube 46 to the waste fluid depository 50 such as a sink which is in flow communication with a sewer system. Alternatively, the water may flow from the outlet tube 46 to a circulating system for recirculation of the water to the inlet tube 44. The use of a plastic or stainless steel material for the interanvil connecting tubes 39 will lessen the possibility of the tubes 39 being oxidized by the water.

In operation, the cooling system will provide a heat sink fluid such as chilled water to the anvils 20A–F which permits the transference of the heat from the anvils 20A–F to the fluid. As the fluid flows from the inlet tube 44 through the anvils 20A–F to the outlet tube 46, the transference of heat to the fluid will lower the operating temperature of the anvils 20A–F thereby reducing the possibility of deleterious effects arising from the overheating of the anvils 20A–F.

Means For Acoustically Insulating An Anvil

In an ultrasonic sealing operation, the anvil 20 is a part of the vibrating system and has to be acoustically insulated from the rest of the machine. The anvil must be acoustical insulated to avoid possible damage to the machine structure and also to reduce the loss of ultrasonic energy to the machine frame. Presently, this acoustical insulation is achieved by a rubber layer between the vibrating portion 24 and the anvil body 23. The rubber layer renders the forward end 21 of the anvil 20 (the sealing portion 26 and the vibrating portion 24) flexible, thus interfering with the pressure distribution of the sealing portion 26. If the rubber is hard and stiff, the insulating effect is low thereby allowing a greater amount of ultrasonic energy to be transferred to the machine frame. If there is a total absence of insulation, the amount of ultrasonic energy transferred is tremendous.

In the present invention, the means for acoustically insulating an anvil 20 has various embodiments. One embodiment is an airspace gap 28 between the vibrating portion 24 and the anvil body 23 as shown in FIG. 1. The airspace gap 28 decreases the amount of ultrasonic energy transferred to the anvil body 23. Another embodiment is illustrated in FIG. 4 in which a specially configured rubber membrane 52 is shaped to increase the bond stress applied to the rubber membrane 52 relative to the repeated stress during operation of the ultrasonic sealing device. As shown in FIG. 4, the rubber membrane 52 has a first section 54 parallel to the sealing portion 26, a second section 56 angled, a third section 58 parallel to the sealing portion 26, a fourth section 60 angled, and a fifth section 62 parallel to the sealing portion. The special configuration prevents the rubber membrane 52 from detaching from the anvil 20 through increasing the bond stress relative to the repeated stress.

Figure 5A:
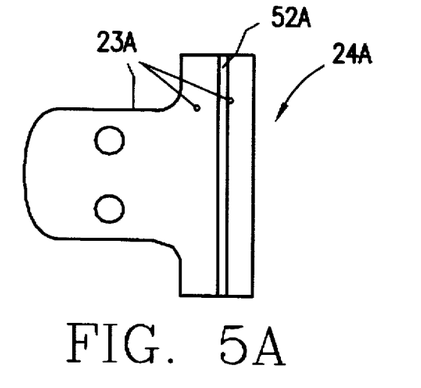
Figure 5B:
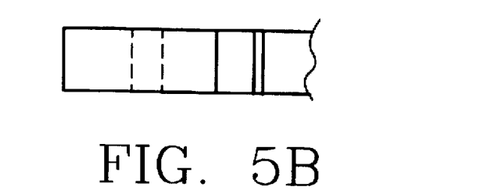
Figure 6A:
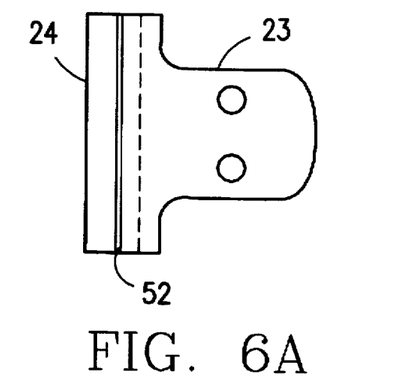
Figure 6B:
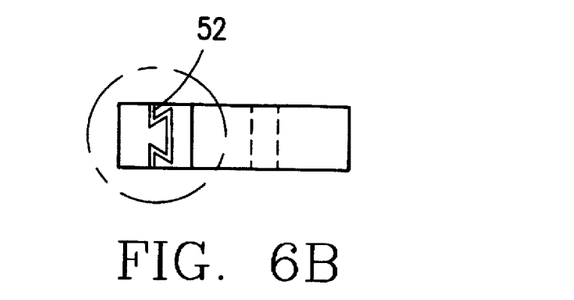
Figure 7A:
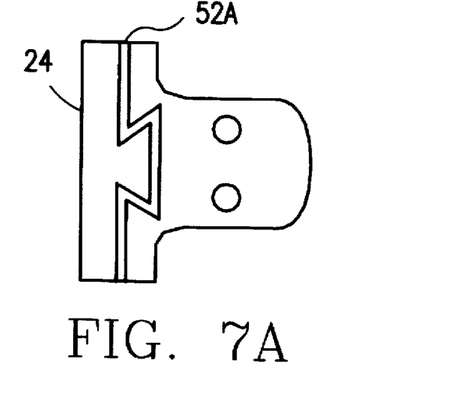
Figure 7B:
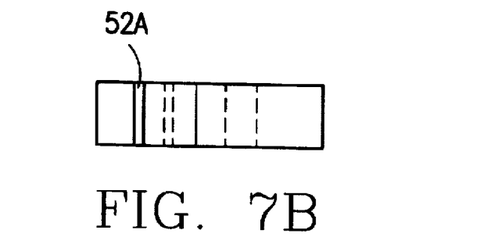

For comparison, there is illustrated in FIGS. 5A and 5B, an anvil of the prior art utilizing a rubber membrane 52A having a virtually straight configuration. The rubber membrane 52A of the prior art is prone to detachment due to the repeated stress and lack of bond stress. There is illustrated in FIGS. 6A and 6B the anvil 20 with the rubber membrane 52 of FIG. 4. An alternative embodiment is illustrated in FIGS. 7A and 7B with the rubber membrane 52 specially configured differently from that shown in FIGS. 6A and 6B.

Sealing Pattern

Figure 8:
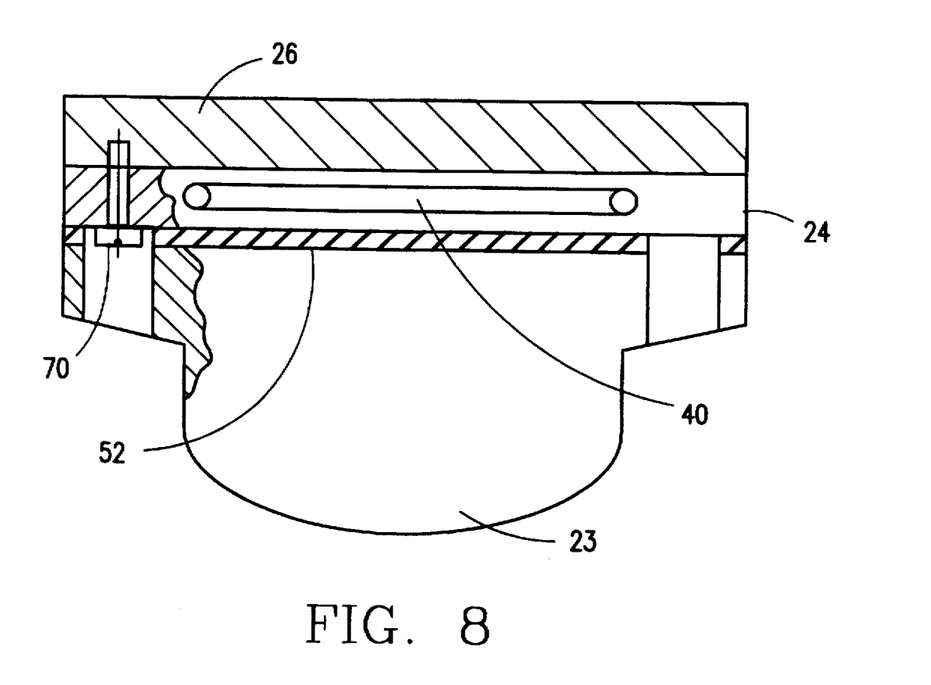

Presently, most anvils have the sealing pattern as an inseparable component of the anvil. The anvil 20 of the present invention, in addition to the previously mentioned aspects, also encompasses a novel construction which separates the sealing portion from the vibrating portion 24, and the rest of the anvil 20. There is illustrated in FIG. 8 a perspective view of alternative embodiment of the anvil of the present invention. The anvil 20 of the present invention may be separated into the following general components: the anvil body 23; the vibrating portion 24; cooling system and the sealing portion 26. The multiple component anvil 20 allows for facilitated substitution or replacement of the components as compared to a typical anvil which must be replaced as an entire unit. The sealing portion 26 may be exchanged without disturbing the 20 insulation between the vibrating portion 24 and the anvil body 23.

A set of screws 70 connect the sealing portion 26 to the vibrating portion 24 and allow for facilitated substitution of sealing portions 26. The screws 70 do not come in contact with the rubber membrane 52 or the internal passageway 40. Revulcanization of the rubber membrane 52 is also avoided when a new sealing portion is needed since the vibrating portion 24 and anvil body 23 which surround the rubber membrane 52 are not displaced during the substitution of sealing portions 26.

Anvil/Horn Stopgap

During ultrasonic sealing, it is obvious that the absence of an object to be sealed, such as packaging material, will result in damage to the anvil 20 and sonotrode 72 of the ultrasonic horn 74. In some specific sealing applications it is necessary to maintain a predetermined distance between the sonotrode 72 and the anvil 20 during the ultrasonic sealing operation. Excess pressure on a packaging material undergoing ultrasonic sealing which results in melted packaging material being extruded from the sealing area is an example of a specific sealing application necessitating the maintenance of a minimal distance between the sonotrode 72 and the anvil 20. In order to prevent damage to the anvil 20 and the sonotrode 72, and to maintain a predetermined distance between the anvil 20 and the sonotrode 72, the present invention includes a plurality of support pads 76 for creating a gap between the sonotrode 72 and the anvil 20.

Figure 9:
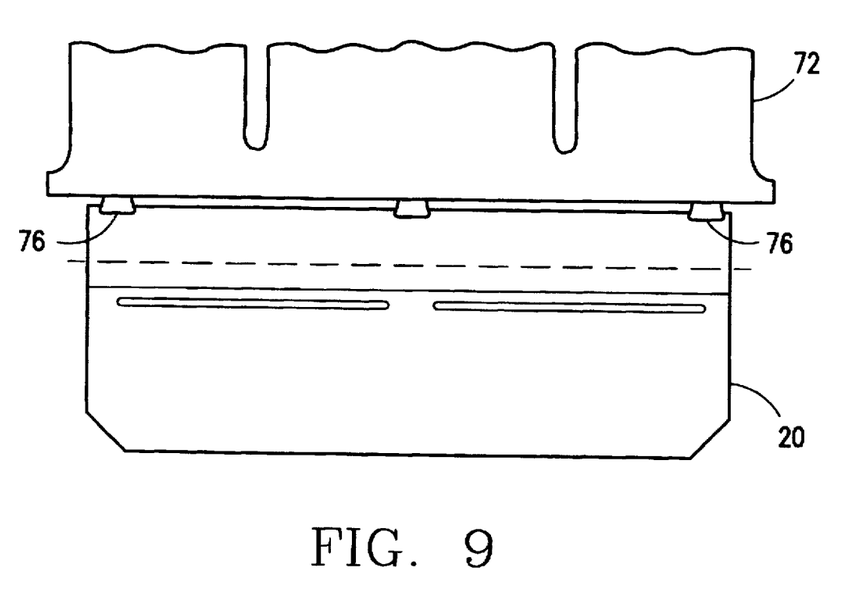
Figure 10:
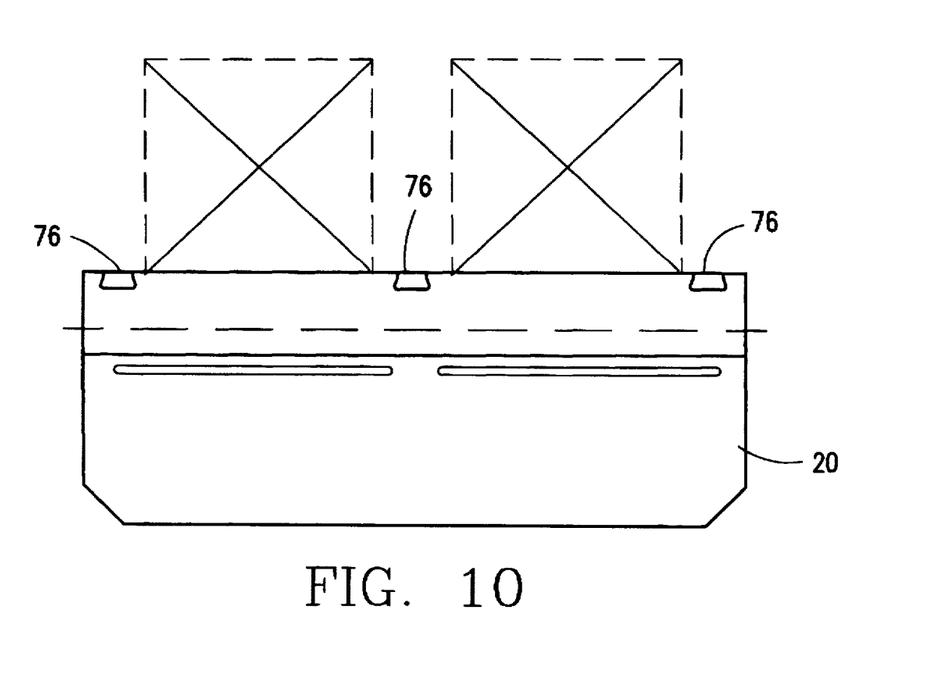
Figure 11:
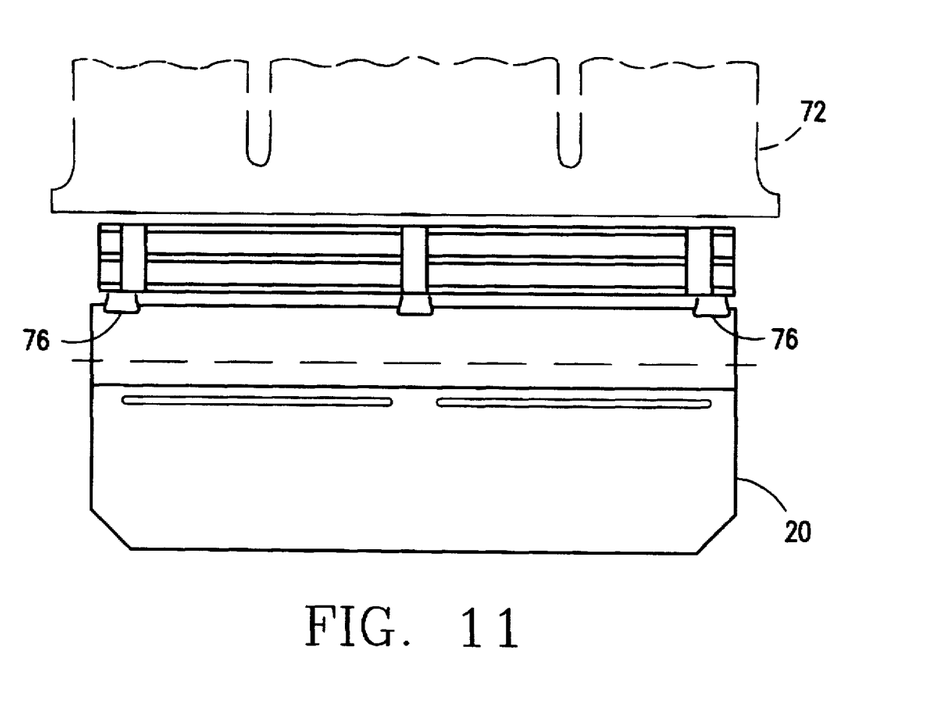

There is illustrated in FIG. 9 a side perspective view of an anvil of the present invention engaged with a sonotrode of an ultrasonic horn. As shown in FIG. 9, the anvil 20 has a plurality of support pads 76 located in predetermined positions to prevent oversealing to a carton fin and damage to the sealing equipment. The plurality of support pads 76 are located on the anvil 20. The support pads 76 are composed of a heat resistant plastic material which has low creep and sufficient durability to withstand the repetitive sealing process. The length of the support pads 76 is determined by the sealing needs. As shown in FIGS. 10 and 11, the length of the support pads 76 is determined by the thickness of the closure to be sealed by the ultrasonic horn and the anvil. If the length is insufficient, then the closure material will extrude outward during the sealing operation. If the length is greater than necessary, the closure will not be properly sealed during the sealing operation. A preferred support pad 76 is composed of a polyetheretherketone ("PEEK"). The PEEK material is capable of withstanding the tremendous loads, upwards of 3000 N, on the support pads 76.

Industrial Applicability

Figure 12:
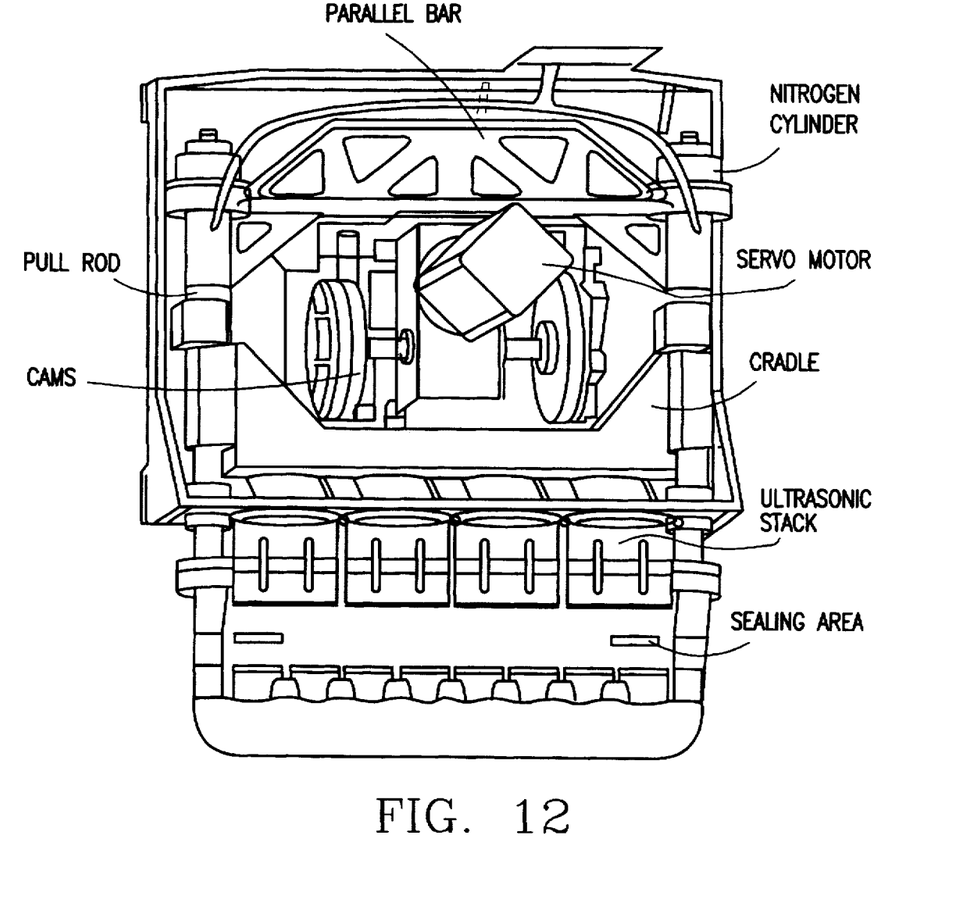

The novel anvil of the present invention may be utilized on a carton sealer such as the one described in Schott et al, copending U.S. patent application Ser. No. 08/315,412, filed on September 28, 1994 for an Ultrasonic Carton Sealer, which is hereby incorporated by reference. The ultrasonic carton sealer of the Schott et al patent application is illustrated in FIG. 12. As mentioned previously, the novel anvil of the present invention may be utilized as a component of a carton sealer on a carton filling and sealing machine such as described in Stark et al. As shown in FIG. 12, the carton sealer has numerous components for performing the sealing operation on a closure. Of interest are the anvils 20A–H, the anvil bar 38 and the ultrasonic horns.

Figure 13:
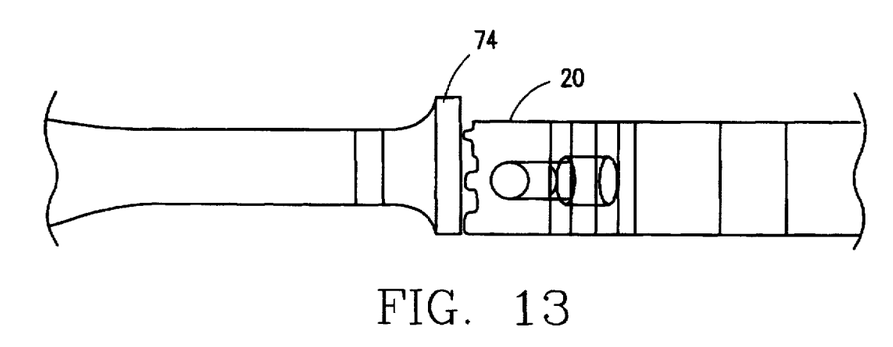
Figure 14:
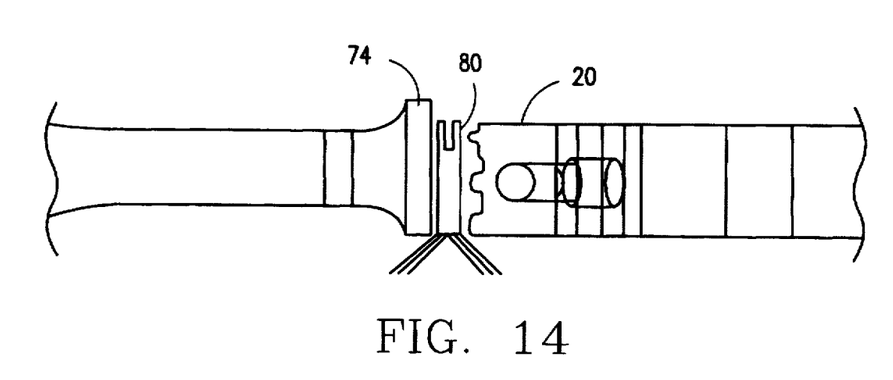
Figure 15:
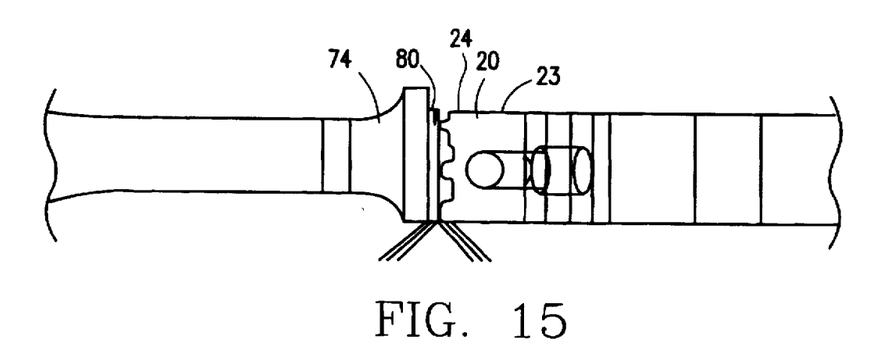

There is illustrated in FIGS. 13–15 a sealing operation performed on a gable-top closure. In FIG. 13, an anvil 20 is disposed opposite to an ultrasonic horn 74. In FIG. 14, a fin 80 of a gable-top closure is positioned between the anvil 20 and ultrasonic horn 74 in anticipation of being sealed through ultrasonic energy. In FIG. 15, the anvil 20 is engaged with the fin 80, forcing it up against the ultrasonic horn 74, in order to seal the closure together through ultrasonic energy generated from the ultrasonic horn 74. The means for acoustical insulation decreases the amount of ultrasonic energy transferred from the vibration portion 24 to the anvil body 23. This also decreases the amount of ultrasonic energy transferred to other components of the carton sealer and the machine.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

We claim as our invention:

1. An anvil, for utilization in conjunction with an ultrasonic horn, a forward end of the anvil facing the ultrasonic horn, the anvil comprising:

an anvil body;

a vibrating portion disposed forward from the anvil body;

a sealing portion attached to the vibrating portion;

means for acoustically insulating the anvil body disposed between the anvil body and the vibrating portion; and, a cooling system disposed within the anvil.

2. The anvil according to claim 1 wherein the means for acoustically insulating the anvil comprises the anvil body connected to the vibrating portion by a pair of parallel bridges thereby forming an airspace slot separating the anvil body from the vibrating portion with the pair of parallel bridges forming a boundary around the airspace slot along with the anvil body and the vibrating portion.

3. The anvil according to claim 1 wherein the means for acoustically insulating the anvil comprises a membrane composed of a rubber configured to increase the bond stress relative to the repetitive stress.

4. The anvil according to claim 1 wherein the sealing portion is comprised of a bar having a upper surface and a lower surface, the upper surface having a sealing pattern thereon and the lower surface disposed to the vibrating portion, the sealing portion connected to the vibrating portion without contact with the means for acoustically insulating the anvil.

5. The anvil according to claim 1 wherein the cooling system comprises the vibrating portion having an internal passageway for the flow of a heat sink fluid therethrough.

6. The anvil according to claim 3 wherein the configuration of the membrane consists of a first straight portion parallel with the sealing portion, a first diagonal portion connected to the first straight portion on one end, a second straight portion parallel to the first straight portion and displaced rearward from the first portion, the second straight portion connected to the first diagonal portion at an opposite end to the first diagonal portion connection to the first straight portion, a second diagonal portion connected to the second straight portion at an end opposite to the first diagonal connection to the second straight portion, a third straight portion connected to the second diagonal portion, the third straight portion parallel to the sealing portion and in the same plane as the first straight portion.

7. The anvil according to claim 4 wherein the sealing portion may be interchanged with another sealing portion.

8. The anvil according to claim 5 wherein the heat sink fluid is water.

9. The anvil according to claim 2 wherein the airspace slot substantially reduces the transfer of energy from the vibrating body to the anvil body.

10. The anvil according to claim 1 further comprising a plurality of pads projecting from the sealing portion and disposed on the sealing portion to avoid interference with the ultrasonic sealing, each of the plurality of pads having a predetermined length substantially corresponding to the minimal thickness of an object undergoing ultrasonic sealing.

11. An anvil system for utilization in conjunction with a multitude of ultrasonic horns, the anvil system comprising:

an anvil bar connected to an anvil drive, the anvil drive providing movement to the anvil bar;

a plurality of anvils mounted to the anvil bar, each of the plurality of anvils having a passageway for cooling of the anvil through the transference of heat from the anvil to a heat sink fluid flowing through the passageway, each of the plurality of anvils capable of performing individual sealing operations in conjunction with an ultrasonic horn;

a plurality of interanvil connecting tubes for the transference of the heat sink fluid between each of the plurality of anvils, each of the plurality of interanvil connecting tubes sealed to each corresponding anvil of the plurality of anvils by at least one O-ring;

a heat sink fluid source in flow communication with the plurality of interanvil connecting tubes through an inlet tube; and a discharge receptacle inflow communication with the plurality of connecting tubes through an outlet tube.

12. The anvil system according to claim 11 wherein each of the plurality of interanvil connecting tubes is composed of a material selected from the group consisting of stainless steel and plastic.

13. The anvil system according to claim 11 wherein the inlet tube is connected to the outlet tube to form a closed loop cooling system whereby the heat sink fluid is continuously circulated through the closed loop cooling system.

14. The anvil system according to claim 11 wherein the plurality of interanvil connecting tubes permit each individual anvil to move independently of one another.

15. An anvil system for utilization in conjunction with a multitude of ultrasonic horns, the anvil system comprising:

an anvil bar connected to an anvil drive, the anvil drive providing movement to the anvil bar;

a plurality of anvils mounted to the anvil bar, each of the plurality of anvils comprising an anvil body, a vibrating portion located forward from the anvil body and having a passageway for cooling of the anvil with a heat sink fluid, a sealing portion disposed above the vibrating portion, and means for acoustically insulating the anvil body disposed between the anvil body and the vibrating portion, each of the plurality of anvils capable of performing individual sealing operations in conjunction with an ultrasonic horn;

a plurality of interanvil connecting tubes for the transference of the heat sink fluid between the passageways of each of the plurality of anvils, each of the plurality of interanvil connecting tubes sealed to each corresponding anvil of the plurality of anvils by at least one O-ring;

a heat sink fluid source in flow communication with the plurality of interanvil connecting tubes through an inlet tube; and a discharge receptacle inflow communication with the plurality of connecting tubes through an outlet tube.

16. The anvil system according to claim 15 wherein the means for acoustically insulating the anvil comprises the anvil body connected to the vibrating portion by a pair of parallel bridges thereby forming an airspace slot separating the anvil body from the vibrating portion with the pair of parallel bridges forming a boundary around the airspace slot along with the anvil body and the vibrating portion.

17. The anvil system according to claim 15 wherein the means for acoustically insulating the anvil comprises a membrane composed of rubber configured to increase the bond stress relative to the repetitive stress.

18. The anvil system according to claim 15 wherein the sealing portion is comprised of a bar having a upper surface and a lower surface, the upper surface having a sealing pattern thereon and the lower surface disposed to the vibration portion, the sealing portion connected to the vibrating portion without contact with the means for acoustically insulating the anvil.

19. The anvil system according to claim 15 further comprising a plurality of pads projecting from the sealing portion and disposed on the sealing portion to avoid interference with the ultrasonic sealing, each of the plurality of pads having a predetermined length substantially corresponding to the minimal thickness of an object undergoing ultrasonic sealing.

* * * * *